Dec. 26, 1972 W. SCHWALM Re. 27,539
WORM MELTER AND EXTRUDER
Original Filed Oct. 17, 1967
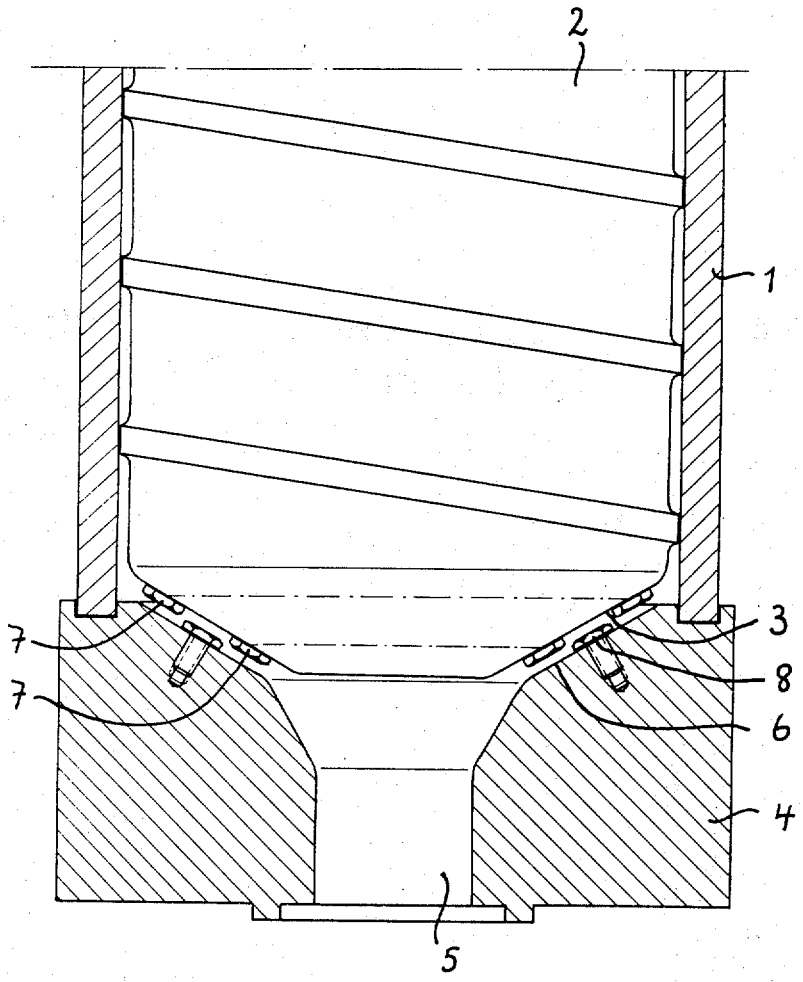
INVENTOR.
WILHELM SCHWALM
BY Bair, Freeman & Molinare Attys.

United States Patent Office

Re. 27,539
Reissued Dec. 26, 1972

27,539
WORM MELTER AND EXTRUDER

Wilhelm Schwalm, Frankfurt am Main, Germany, assignor to Vickers-Zimmer Aktiengesellschaft Planung und Bau von Industrieanlagen, Frankfurt am Main, Germany Original No. 3,496,604, dated Feb. 24, 1970, Ser. No. 675,987, Oct. 17, 1967. Application for reissue Oct. 29, 1970, Ser. No. 85,314
Claims priority, application Germany, Oct. 31, 1966, V 32,234
Int. Cl. B28b *27/02*
U.S. Cl. 259—191 4 Claims

Matter enclosed in heavy brackets [ ] appears in the original patent but forms no part of this reissue specification; matter printed in italics indicates the additions made by reissue.

ABSTRACT OF THE DISCLOSURE

The specification discloses an improved worm melter or extruder for highly viscous plastic melts which normally flow in laminar fashion. The discharge end of such melter or extruder is usually formed by an end surface of a worm and an inside surface of a mouthpiece. The present invention provides means projecting from said end surface and said inside surface to break up the melt passing through the discharge end to effect a turbulence and mixing within the melt to produce a more uniform product.

BACKGROUND OF THE INVENTION

Field of the invention—Description of the prior art

The invention relates to a homogenization device for worm melters or extruders which contain a worm rotatable in a casing, the end surface of said worm being arranged at a short distance from the casing mouthpiece provided with a discharge passage.

In the processing of plastics, such as thermoplastic materials, in worm melters or extruders non-homogeneities or non-uniformity occur very easily in the product discharged. Such non-homogeneities may arise, for example through temperature differences between the casing wall and the worm surface as well as through insufficient mixing of the material. This phenomenon is detectable especially at throughput rates which result in reduced residence times for the plastic materials.

Such non-homogeneities have a very adverse effect on the product quality, for example, deterioration of the physical properties of the products produced from the melts and/or great differences in these properties. These non-homogeneities in the products are especially noticeable if the discharge material is fed over connecting passages or pipe lines to several different processing stations, such as tools, spinning devices, nozzles or the like.

Since the high viscosities of such plastic melts almost always result in laminar flow pattern with no turbulence or thorough mixing in the pipe lines, even if gear wheel pumps are interposed, the plastic melts may arrive at the next processing station in flows of varying temperature and thereby with differing viscosity. Thus, for example, it was observed that in the spinning of two separate threads from a spinning nozzle, as a result of the non-homogeneous melt, the amount of melt appearing on the one side of the spinning nozzle was always greater than that appearing on the other side, whereby there resulted great deviations in the denier of the threads. Furthermore, in supplying several parallel processing stations with a non-homogeneous melt, it was found that the melt to each station varies constantly in viscosity, which results, inter alia, in considerable differences in the physical values of the threads spun at the individual stations.

Attempts to eliminate such non-homogeneities in highly viscous melts by heat treatment during the flow through pipelines, even over relatively long periods of time, have led to no success whatsoever. Such failure is probably due to the constantly laminar flow conditions, especially since the high viscosities of the melts require certain minimum pipe cross sections to keep the pressure drops within reasonable limits.

In order to arrive at a good homogeneous end product together with high production rates, various proposals have been made for worm extrusion presses. In these proposals, essentially quality reductions on increases of worm speeds are compensated by increasing the pressure in the plastic composition. Such a pressure build-up can be achieved, for example, in a worm with conical end surface which lies opposite a corresponding cone of the mouthpiece, by an axial-wise shifting of the worm, which changes the size of the emergence gap or the outlet and thereby changes the pressure on the plastic composition within the melter or extruder (see Der Plastverarbeiter, No. 1, 1962). In another proposal (German patent specification 1,145,787), the plasticized material is subjected to a high compression in the extrusion press, depending on its properties on one or more stages of the path to be covered in the press cylinder, by an arrangement in the extrusion press compression sections consisting of an annular collar interrupting the worm courses, whose outside diameter is equal to or somewhat smaller than the diameter of the bore of the press cylinder and a flat annular groove provided in the bore of the press cylinder with differing depth in the axial direction. By axial-wise shifting of the worm, the effect of the compression sections may be modified.

The above described proposals are rather expensive and they are not successful for processing all types of plastics in every kind of extruders or worm melters.

In contrast to the above, the present invention provides a homogenization device for worm melters and extruders which is extremely simple and even permits mounting on nearly all forms of extruders or worm melters subsequent to their original installation.

OBJECTS

It is an object of the present invention to provide a worm melter or extruder for viscous plastic melts which has an increased mixing effect on said melts and which produces products of increased uniformity.

It is another object to provide an improved worm melter or extruder inexpensively.

It is a further object of the invention to provide an inexpensive method for converting existing worm melters and extruders to increase their mixing effect and product uniformity.

Still other objects can be gathered from the following disclosure.

THE INVENTION

The above objects are achieved, according to the invention, by means projecting from the end surface of the worm as well as on the interior surface of the mouthpiece opposing said end surface, said projecting means lie on circles coaxial and central to the worm axis. Preferably, the projecting means are arranged in such a way that the circles of projections on the end surface of the worm and the circles of projections on the inner surface of the mouthpiece alternate successively, with a small radial spacing thereinbetween.

Through the device according to the invention, there is achieved a surprisingly effective mixing and homogenization action, because the projecting means turn against one another in "comb fashion" to automatically break up the melt running through thereby creating turbulence and mixing in the melt. This makes the use of other expensive homogenizing devices normally unnecessary although such other homogenizing devices may be used in addition to the device of the present invention without any difficulty. Moreover, the device of the invention can be economically and conveniently installed on existing worm melters and extruders to increase their efficiency.

In an experiment, there were spun from a two-part spinning system which was fed from a worm melter two equal cord base threads of nylon 6. With a throughput of 366 g./min., the thread of the first spinning station had a tearing strength of 7.5 g./denier and a breaking stretch of 18.0%, while the thread from the second spinning station had a tearing strength of 6.8 g./denier and a breaking stretch of 20.8%. Thereafter, the homogenization device according to the invention was installed in the worm melter and the experiment repeated under otherwise entirely identical conditions. The thread from the first spinning station now has a tearing strength of 7.2 g./den. and a breaking stretch of 20.2% whereas the thread from the second spinning station now has a tearing strength of 7.07 g./den. and a breaking stretch of 19.8%. By simple installation of the homogenization device according to the invention, the differences in the properties of the threads from the two spinning stations were considerably reduced—namely, for the tearing strength the difference was reduced from 0.7 g./den. to 0.13 g./den. and for the breaking stretch the difference was from ca. 3.0% to 0.4%. These reduced differences now lie within the normal range of allowable tolerances. It is possible to reduce these differences still further, when practicing the present invention, by a temperature modification at the worm melter: a temperature alteration on a worm melter not equipped from the device according to the invention is without effect.

Further details of the invention are explained below with the aid of the appended drawing.

In the drawing, which represents a longitudinal sectional view of the discharge end of a worm melter, there is shown a worm 2 in a casing 1, the end of which worm terminates in a conical surface 3. On the casing 1 there is placed a mouthpiece 4 which has a cylindrical output aperture 5. Aperture 5 widens conically in the direction of worm 2 in such a manner that the mouthpiece 4 has a conical surface 6 lying parallel opposite the worm 2.

On the conical surface 3 of the worm 2 there are arranged circularly about the worm axis two rows of projections 7 situated at a regular distance from one another. On the conical surface 6 of the mouthpiece 4 there are situated one or more corresponding circles of projections 8 (only one circle of projection 8 is shown in the drawing), which lie on both sides of the circle of projections 7 and have a small radial spacing from this. The projections have studlike form and consist, in the example represented, advantageously of the heads of screws set in the worm 2 and the mouthpiece 4.

*As shown in the drawing the projections 7 and 8 are flat and wide being substantially greater in width dimension than in height dimension. The distances between surfaces 3 and 6 defining the narrow annular discharge passage is approximately equal or slightly less than twice the height dimension of the projections.*

When the melt, which normally flows in laminar form by reason of its high viscosity, enters the gap between the conical surface 3 of worm 2 and the conical surface 6 of the mouthpiece 4 it is torn up and broken in its flow by the projections 8 and 7 which move past one another in comb form to produce turbulence and mixing. Through this process existing non-homogeneities in the melt are eliminated.

It is obvious that on the worm end and on the inside surface of the mouthpiece there can be arranged more or less than three circles of projections and that the projections there may have the most diverse forms, and may, for example, have a round, oval or irregular cross section. The device can be made especially simple and effective, however, by putting in screws since—aside from the advantages in manufacturing technique—their angular (*polygonal*) heads are extremely advantageous for the mixing process.

Likewise, the worm end and the inside of the mouthpiece do not have to be shaped conically, but may have any other form. If, for example, the worm is cut at a right angle, and/or its end is at a relatively large distance from the discharge end of the mouthpiece, then the projections can extend, as viewed from the worm axis, in radial direction on the worm end and the corresponding cylindrical part of the mouthpiece wall or casing wall. There are many different possibilities for the mounting of the projections. It is only important that the projections on the worm and the mouthpiece wall interact in comb fashion in such a way that the melt is torn up in its flow and set in turbulence.

What is claimed is:

[1. In a worm melter or extruder for viscous plastic melts of the type comprising a rotatable worm disposed within a housing, the region of communication between an end surface of said worm and a corresponding end surface of said housing defining a discharge passage, the improvement comprising providing a plurality of means projecting from said end surface of said worm and from said end surface of said housing, said means on each of said end surface form circles concentric with said worm's axis, and the circles on said end surface of said worm and the circles on said end surface of said housing alternate and intermesh in comb fashion when said worm is rotated, thereby interrupting the flow of said melts through said discharge passage to create turbulence and mixing within said melts.]

[2. A melter or extruder according to claim 1 wherein said means are screws set into said surfaces.]

[3. A melter or extruder according to claim 2 wherein said screws have angular heads.]

[4. A melter or extruder according to claim 1 wherein said surfaces are conically shaped to define a conically annular discharge passage, said end surface of said worm having 2 circles of said means thereon and said end surface of said housing having one circle of said means, said circle on said housing being positioned between the circles on said worm.]

*5. In a worm melter or extruder for viscous thermoplastic melts characterized by laminar flow through a conical discharge passage comprising a rotatable worm disposed within a housing, the region of communication between an end surface of said worm and a corresponding end surface of said housing defining a narrow annular discharge passage, the improvement comprising providing a plurality of closely-spaced flat projections projecting from said end surface of the worm and said end surface of the housing into said passage, which projections cooperate to create turbulent flow of plastic melt in said passage when the worm is rotated; said projections being substantially greater in width than in height dimension and positioned on each of said end surfaces in the form of a circle concentric with the axis of said worm, said projections on said worm alternating and intermeshing in comb like fashion with the projections on said housing when said worm is rotated, thereby interrupting the flow of said melt through said discharge passage to create turbulence and mixing within said melt.*

*6. The melter of claim 5 wherein said projections are screw heads set on said surfaces.*

*7. The melter of claim 6 wherein said heads are polygonal in shape.*

*8. The melter of claim 5 wherein said worm surface has two circles of projections, and said housing surface has one circle of projections disposed between said two circles.*

References Cited

The following references, cited by the Examiner, are of record in the patented file of this patent or the original patent.

UNITED STATES PATENTS

| | | | |
|---|---|---|---|
| 3,000,618 | 9/1961 | Oakes | 18—12 C UX |
| 3,169,752 | 2/1965 | De Laubarede | 18—12 SE X |
| 2,810,159 | 10/1957 | Teichmann | 18—12 SE |

| | | | |
|---|---|---|---|
| 1,971,623 | 8/1934 | Anderson. | |
| 2,732,587 | 9/1956 | Greene | 18—12 |
| 2,838,794 | 6/1958 | Munger et al. | |
| 2,936,161 | 5/1960 | Cummings et al. | |

FOREIGN PATENTS

| | | |
|---|---|---|
| 496,821 | 1930 | Germany. |

H. A. KILBY, Jr., Primary Examiner

U.S. Cl. X.R.

425—208